Aug. 2, 1949.　　　　R. TAYLOR ET AL　　　　2,478,024
WORKMAN'S TIME RECORDING SYSTEM
Filed March 22, 1944　　　　3 Sheets-Sheet 2
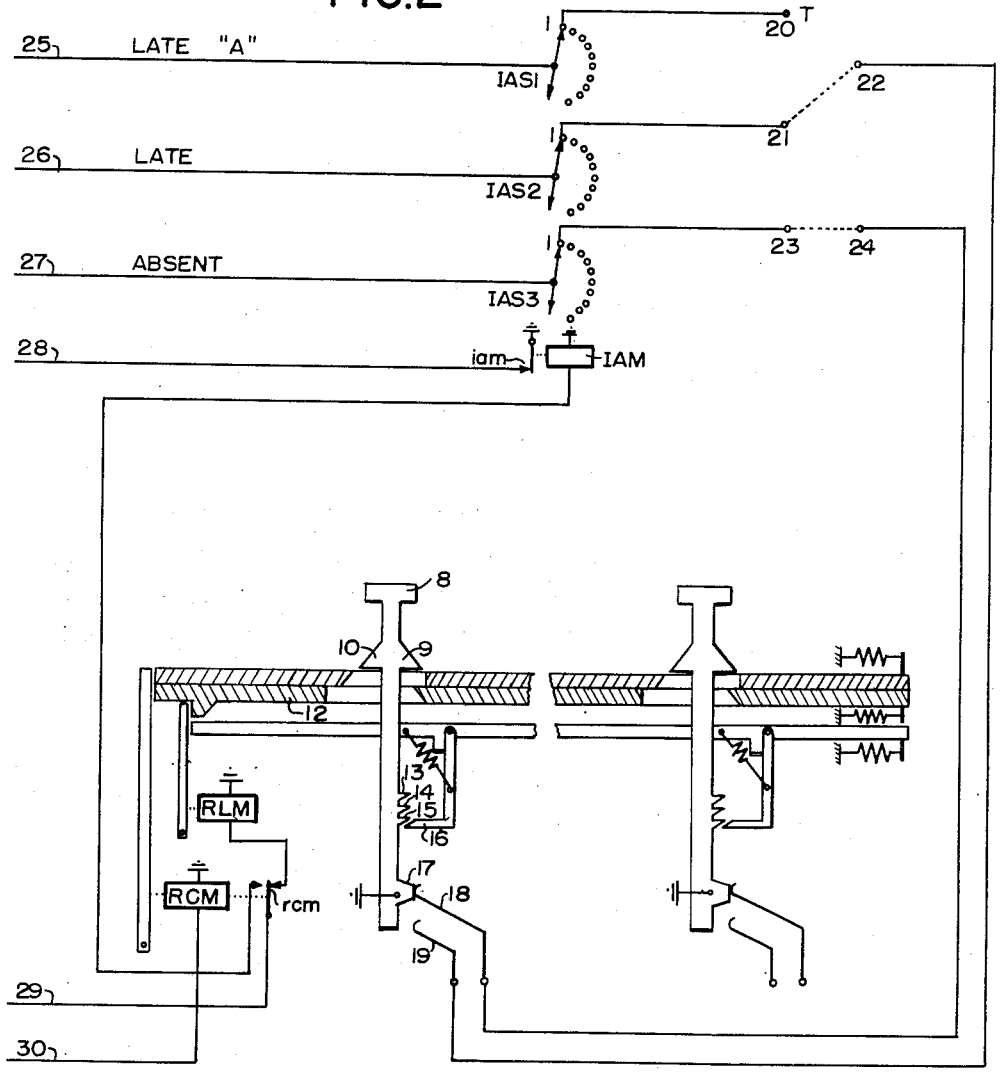

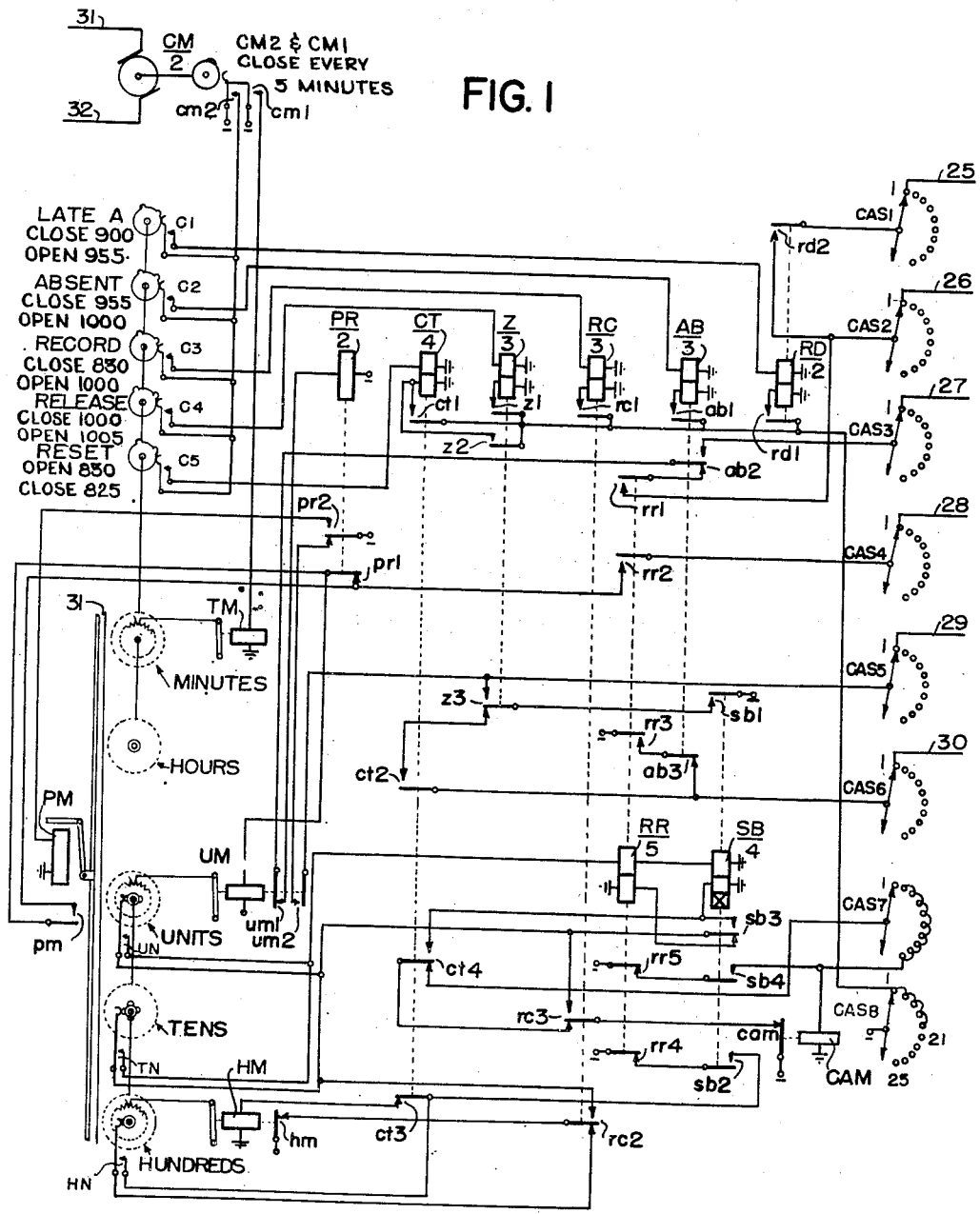

Aug. 2, 1949.   R. TAYLOR ET AL   2,478,024
WORKMAN'S TIME RECORDING SYSTEM
Filed March 22, 1944   3 Sheets-Sheet 3
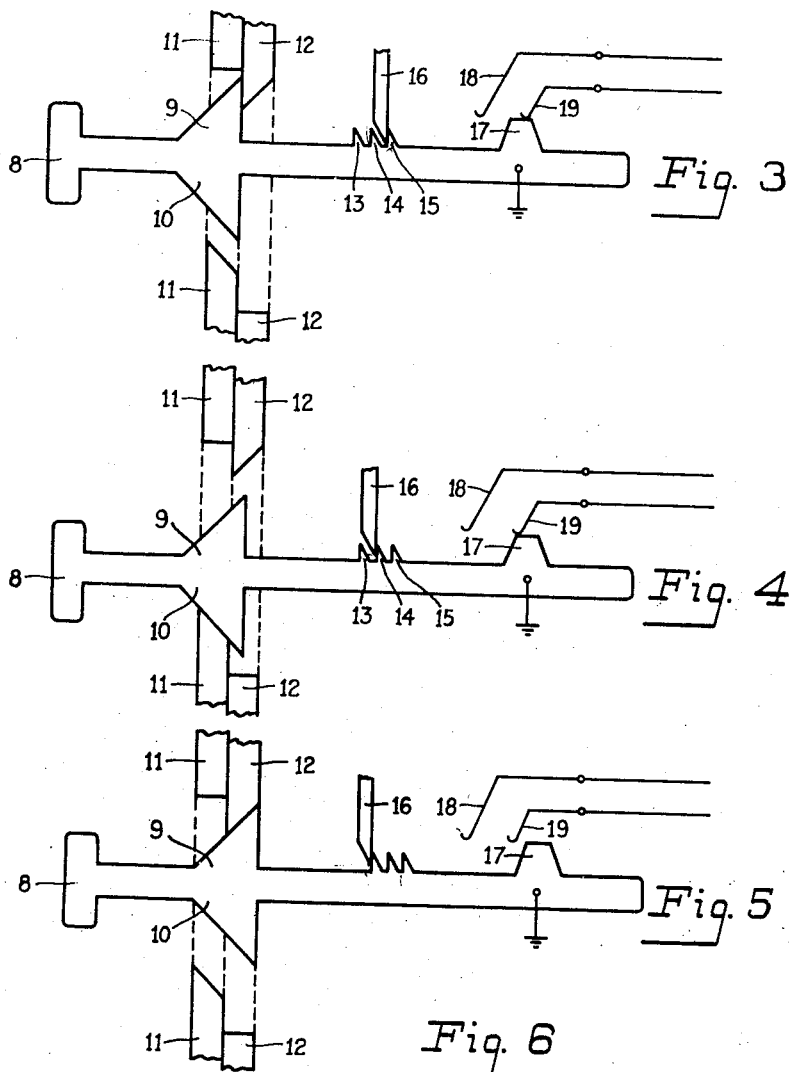
| TYPEWHEEL | DRIVING SOURCE | STEPS/ REV | MARKING | | | | | | | | | | | | | | | OFF NORMAL SPRINGS OPEN |
|---|---|---|---|---|---|---|---|---|---|---|---|---|---|---|---|---|---|---|
| MINUTES | TM | 24 | 00 | 05 | 10 | 15 | – | 50 | 55 | 00 | – | 30 | 35 | – | 55 | | | |
| HOURS | FROM MINS WHEEL | 24 | 00 | 01 | 02 | 03 | – | 10 | 11 | 12 | – | 18 | 19 | – | 23 | | | |
| UNITS | UM | 20 | 0 | 1 | 2 | 3 | – | 0 | 1 | 2 | – | 8 | 9 | | | | | UN ON BOTH 0ˢ |
| TENS | FROM UNITS WHEEL | 20 | 0 | 1 | 2 | 3 | – | 0 | 1 | 2 | – | 8 | 9 | | | | | TN ON 0ˢ & 5ˢ |
| HUNDREDS | HM | 20 | 0 | 0 | 1 | 1 | – | 5 | 5 | 6 | – | 9 | 9 | | | | | HN ON FIRST 0 |
| TYPEWHEEL POSITION → | | | 1 | 2 | 3 | 4 | – | 11 | 12 | 13 | – | 19 | 20 | – | 24 | | | |
INVENTORS
REGINALD TAYLOR
GEORGE THOMAS BAKER
BY
ATTORNEY Patented Aug. 2, 1949

2,478,024

UNITED STATES PATENT OFFICE 2,478,024

WORKMAN'S TIME RECORDING SYSTEM

Reginald Taylor and George Thomas Baker, Liverpool, England, assignors to Automatic Electric Laboratories, Inc., Chicago, Ill., a corporation of Delaware Application March 22, 1944, Serial No. 527,642
In Great Britain April 2, 1943

12 Claims. (Cl. 346—45)

The present invention relates to workmen's time recording systems and has for its object to provide an improved system wherein the timing and recording arrangements for a plurality of groups of workmen are centralised so that the individual group time clocks hitherto required are rendered unnecessary.

According to one feature of the invention in a workman's time recording system, devices operable successively to a plurality of different operated positions are provided individual to the different workmen and are arranged for movement from one particular position to the next to be effected manually by the workmen and from another particular position to the next to be effected from centrally located recording equipment common to a plurality of devices.

According to another feature of the invention, in a workman's time recording system, devices operable by the different workmen are provided at a plurality of operating points and timing equipment at a central control point is adapted to initiate a plurality of different operations thereat each of which involves control of the devices at the operating points by equipment at the central point.

A further feature of the invention is that in a workman's time recording system, devices individual to the different workmen are arranged in response to a momentary operation to effect the temporary registration of the desired information as to the movements of the particular workmen, the said registrations being transferred to central recording equipment at predetermined times.

Still another feature of the invention is that in a workman's time recording system, the operation of devices individual to the different workmen at a plurality of operating points serves to produce a printed record at a central point, switching equipment for associating the central recording equipment with the individual devices being arranged to control the setting of type wheels or like indicating devices so that the various individual devices may be identified without the need for sending signals characteristic thereof.

The invention will be better understood from the following description of one method of carrying it into effect, reference being had to the accompanying drawings comprising Figs. 1-6. Fig. 1 shows circuits of the centralised control unit which includes the timing and recording equipment.

In the lower part of Fig. 2 there is shown in diagrammatic form a group of the workmen's electric contact making push buttons or keys, while in the upper part is shown circuits of a keying unit which includes a plurality of such keys, each of which is accessible over the wipers and banks of the access switch IAS serving said unit. The individual access switches in each keying unit and the common access switch CAS in the control unit of Fig. 1 are all of the electromagnetically-operated reverse-drive step-by-step rotary type as used in telephone systems, and are usually referred to as uni-selectors.

Figs. 3-5 show the various stages of operation for one of the push keys of Fig. 2, while Fig. 6 tabulates the various requirements of the recording type wheels of the control unit of Fig. 1.

The system is assumed to provide for the centralised time recording of 1000 workmen or employees and for this purpose there are assumed to be 20 keying units each of which is provided with 50 push keys.

In the circuits the number of contact units carried by each relay is shown beneath its designation, as for instance $$\frac{RD}{2}$$

Fig. 1, for relay RD, the contact units being designated individually in small letters which in this instance will be $rd1$ and $rd2$. A slow-to-operate relay such as SB, Fig. 1, is shown with a cross at one end of the rectangle indicative thereof. Of the various uniselectors such as the common access switch shown in Fig. 1 which will be referred to as CAS, the various sets of wipers and banks are designated CAS1, CAS2, etc., the driving magnet will in this instance be designated CAM and the magnet interrupter contacts will be designated $cam$.

Referring now to Fig. 2, each keying unit accommodates a block of 50 push keys similar to the ones shown, and is connected by six wires such as 25-30 to the banks CAS1-CAS6 of the common access switch CAS in the control unit of Fig. 1, the control unit being arranged to be associated in turn with each of the twenty keying units over wipers and banks CAS1-CAS6.

Employees on arrival depress their keys to the partly-depressed position shown in Fig. 3, in which position, as described later, they remain until the specified entry time of say 08.30 hours is reached when access is automatically had by the control unit to each of the keying units in turn over the access switch CAS and the partly-operated keys in each keying unit are fully operated electromagnetically by a two-stage movement as shown in Figs. 4 and 5 respectively, but no record is made and such keys are merely prevented from affecting the central equipment further so as not to be included in the recording of absent employees which will be done subsequently. In this connection it may be mentioned that a key in normal position as in Fig. 2 is characterised by the application of earth to a contact spring such as 18, a partly-depressed key in either of the stages shown in Figs. 3 and 4 is characterised by an earth on a contact spring such as 19 and a fully depressed key as shown in Fig. 5 is characterised by the absence of earth on both the contact springs 18 and 19.

At 08.35 hours and at five-minute intervals up to 09.55 hours, keys which have been partly depressed by late-comers to the position shown in Fig. 3 are fully operated electromagnetically and a record is made by the control unit of the key numbers and times concerned. The time is determined by timing equipment within the control unit, while the key numbers concerned for any given time are determined partly by the common access switch CAS which selects the keying unit and partly by the individual access switch IAS which selects the key within the selected unit, these access switches being operated in synchronism with the numerical type wheels of the recording equipment in the control unit in a manner which will be later described. At 10.00 hours all employees who have not depressed their keys by this time are assumed to be absent and a record is then made of all unoperated keys. Finally, at say 10.05 hours, all keys are released for further use.

Before a description of the detailed circuit operation is given the key numbering and type wheel marking arrangements will be reviewed. One thousand employees are assumed to be concerned, catered for in twenty keying units of fifty keys each. The various access uniselectors are of the 25-point type, and hence in the control unit twenty out of the twenty-five possible positions on the access switch CAS will be used to give access to the twenty keying units. In each keying unit, in order to enable access to be had to the fifty keys concerned, the 25-point access switch IAS is adapted in well-known manner to have a capacity of 50 points by providing it with two sets of wipers arranged in 180° phase relationship to each other so that each set of wipers operates over an arc of contacts in turn. The wipers of switches CAS and IAS are rotated by means similar to those shown in the Ostline Patent 1,674,411 issued June 19, 1928. In order to simplify the circuit drawing all the access switches have been shown to be of the 10-point type. The fifty keys of the twenty various keying units are numbered 000–049, 050–099, 100–149, 150–199 and so on up to 950–999.

As regards the recording type wheels, the markings of which are indicated in Fig. 6, both the minutes and hours wheels are assumed to perform twenty-four steps per revolution, the minutes wheel being calibrated at five minute periods. The timing basis for the control unit of Fig. 1 is a small mains driven synchronous clock type motor CM which is operated from the mains-connected leads 31 and 32 and which carries contacts cm1 and cm2 which close at five-minute intervals. Contacts cm1 are effective on magnet TM which drives the minutes wheel which thus advances one step every five minutes.

The hours wheel is mechanically linked with the minutes wheel in such manner that it takes one step for twelve steps of the latter.

For the purpose of obtaining signals at predetermined times such as as 08.30, 10.00, 13.30 hours and so on there is coupled to the minutes wheel shaft an auxiliary camshaft mechanism which advances one step every five minutes and which at predetermined times throughout the day closes one or other of the contacts C1–C5 as labeled on Figure 1. The camshaft mechanism and associated contacts might conveniently be replaced by one or more uniselectors which would be stepped at five minute intervals and the banks of which would be suitably strapped so that signalling potentials could be sent forward over different leads at different times.

As regards the units, tens and hundreds type wheels, the units wheel is driven by magnet UM (Fig. 1) which is energised once for each energisation of any one of the individual access switches in the keying units, while the tens wheel is mechanically linked to the units wheel so that for every ten steps of the latter the tens wheel is advanced one step. The hundreds wheel is driven by magnet HM which is energised once for each energisation of the common access switch magnet CAM, but since this switch has to make two steps and so connect with two keying units before one hundred keys can be dealt with, the markings on the hundreds type wheel are in pairs so that the indication will change only after two steps of the wheel. A detailed description of the operation arrangement of the magnet HM, the switch magnet CAM, and the hundreds wheel appears at a later point in the specification.

More detailed consideration will now be given to the push keys and their operation and also their electrical connection to the banks of the associated access switch.

Each push key is of the pressed out form shown diagrammatically in the lower part of Fig. 2 and is mounted on a suitable panel in association with forty-nine other keys so as to form a keying unit of suitable size and shape. On the face 8 or adjacent thereto is carried the number for each key. When a key such as that shown in Fig. 2 is pushed in by the employee concerned against the pressure of a suitable loading spring, the dog 16 which is pivotally secured to a release plate common to all keys of the unit rides up the inclined face of tooth 15, and when the limit of inward travel as far as the employee is concerned is reached, as determined by tooth 9 engaging with the upper portion of plate 12, dog 16 will engage behind the tooth 15 as shown in Fig. 3 so as to lock the key in the position to which it has been depressed. The plates 11 and 12 are common to all keys on the unit and are together operable under control of the reset magnet RCM, while plate 12 is also operable together with the release plate supporting dogs 16 under control of the release magnet RLM.

At say 08.30 hours the magnet RCM in each keying unit is operated in turn and in response to the operation of the magnet shown, plates 11 and 12 are given an upward movement. In response to this movement the lower inclined portion of plate 11 engages with the inclined face of tooth 10 on all keys which have been manually depressed and so moves these keys over to the position shown in Fig. 4 where the dog 16 engages behind tooth 14. On the release of magnet RCM, the plates 11 and 12 restore under strong spring pressure to their original positions and in so doing the upper inclined part of the plate 12 engages with the inclined face of the tooth 9 of all keys occupying the position shown in Fig. 4, whereupon such keys are moved over to the fully operated position shown in Fig. 5 where they are further held by engagement of dog 16 behind the tooth 13 on each key.

When, subsequently, it is desired to release the fully depressed keys, the release magnet RLM is energised, whereupon the dog 16 is withdrawn from engagement with the holding tooth 13 on each key concerned and at the same time by suitable mechanical coupling between the release magnet armature and plate 12, this plate is moved upwardly by an amount sufficient to enable the upper portion to clear tooth 9. Each key then restores to the normal position shown in Fig. 2 under pressure of its loading spring.

As regards the electrical connections of the keys to the access switch, each key is earthed and normally connects over projection 17 with lead 18. It is to be noted that the negative sign on the drawings is indicative of negative pole of the battery source, whereas the earth sign is indicative of the positive pole of the battery source. When the key is manually depressed to the position shown in Fig. 3, an earth connection is made instead with spring 19 and this connection is maintained until the key is fully-operated when it will occupy the position shown in Fig. 5. The contact springs of each key are wired out to a tag block T, springs 18 and 19 connecting with terminals 22 and 24. If the employee is one who has to conform to the normal starting time, terminals 22 and 24 are wired across to terminals 21 and 23, as shown which connect up with a given position on the banks IAS2 and IAS3 in accordance with the number of the key concerned within the unit. The first key on the unit will connect with the first contact on these banks, the second key with the second, and so on up to the fiftieth contact on the banks. Where an employee is privileged in that he has a later starting time than the other employees in the group, terminal 22 will be cross-connected to terminal 20 so that suitable discrimination can be made by the time recording equipment.

Considering now the circuit operation and referring to the control unit circuit of Fig. 1, contacts $cm1$ and $cm2$ are closed at five-minute intervals for periods sufficiently long to energise a type wheel magnet or a standard relay. On each closure of contacts $cm1$, the minutes type wheel magnet TM is energised and since the type wheels are driven on the reverse drive principle, on each opening of contacts $cm1$ the minutes type wheel is advanced one step. As previously mentioned, the hours type wheel is operated via mechanical linkage from the minutes type wheel.

At a specified entry time of say 08.30 hours, contacts $cm1$ and $cm2$ will be operated as usual, while in addition the "reset" cam contacts $c5$ which will have been operated when the minutes wheel moved over to .25 at 08.25 hours will still be closed. Relay CT thereupon operates over its left-hand winding and locks over its contacts $ct1$ to battery via bank and wiper CAS9 of the common access switch CAS. At contacts $ct3$ any circuit for the hundreds type wheel magnet HM is opened and at contacts $ct4$ a circuit is completed for the slow-to-operate relay SB.

On the operation of relay SB, battery is extended over contacts $sb1$, $z3$ and $ct2$ to wiper CAS6, and with this wiper on its home position 1, as shown, battery potential will then extend over lead 30 to energise the reset magnet RCM in the first of the twenty keying units which are to be connected with in turn by the control unit. If prior to 08.30 hours any of the keys in this keying unit have been manually depressed to the position shown in Fig. 3, the reset magnet RCM in energising will advance such keys to the position shown in Fig. 4. Relay SB in operating also at contacts $sb4$ energises the access switch magnet CAM.

During the period that relay SB is operated, timing contacts $cm1$ and $cm2$ will open and contacts $cm1$ in opening open the circuit of the magnet TM, whereupon the minutes wheel advances to 30, the hours wheel remaining at 08. The minutes wheel in advancing to 30 will open the "reset" contacts $c5$ but relay CT remains locked over its local locking circuit. The "record" contacts $c3$ are also closed in this position of the wheel but these contacts do not become effective until 08.35 hours since contacts $cm2$ are now open.

On the energisation of the access switch magnet CAM the magnet interrupter contacts $cam$ in opening open the circuit of relay SB. On the resultant release of relay SB, contacts $sb1$ open the circuit for the reset magnet in the first keying unit, whereupon the keys therein which have been moved to the position shown in Fig. 4 are advanced to the fully operated position shown in Fig. 5. At contacts $sb4$ the circuit for the magnet CAM is opened and this magnet in releasing advances synchronously all of the CAS switch wipers to position 2 in the manner heretofore specified.

On the release of magnet CAM the interrupter contacts $cam$ reclose and re-energise relay SB, on the operation of which battery is now extended over wiper CAS6 in position 2 to energise the RCM magnet of the second keying unit. Relay SB in re-operating re-energises magnet CAM and interaction between this magnet and relay SB continues until all the twenty keying units which connect respectively with contacts 1–20 on the access switch CAS have been dealt with. The CAS switch wipers will then be advanced to position 21 and on closure of the contacts $cam$, relay SB will commence to re-energise. The holding circuit for relay CT is, however, broken at wiper and bank CAS9, since the bank contacts will only be strapped from contacts 1–20 and therefore at contacts $ct4$ the energising circuit for relay SB is broken and a self-interrupted driving circuit is completed for the access switch magnet CAM from negative battery over contacts $cam$, $re3$, $ct4$, the multipled contacts of bank CAS7 and associated wiper to the magnet CAM and positive potential, so as to restore the wipers of this switch to the home position 1 where the driving circuit is opened. The control unit after thus having fully displaced the keys representing punctual employees without having recorded their numbers, now awaits the expiry of the five-minute period.

As previously mentioned, the minutes wheel in advancing to 30 opened the "reset" contacts $c5$ and in addition closed the "record" contacts $c3$. Hence at 08.35 hours when contacts $cm1$ and $cm2$ are again momentarily closed, they will respectively energise the minutes magnet TM and also relay RC. On the opening of the contacts $cm1$ and $cm2$, the circuits for magnet TM and relay RC are opened but the latter remains locked over bank and wiper CAS8. Magnet TM in releasing advances the units wheel to 35, but the "record" contacts c3 remain closed, no further cam contacts being operated at this stage.

Relay RC in operating at contacts rc2 and rc3 completes an operating circuit for relay RR which operates and at contacts rr1 connects relay PR to wiper CAS2, which in position 1 connects over lead 26 with wiper IAS2 of the access switch IAS in the first keying unit. At contacts rr2 relay RR connects the units magnet UM via wiper and bank CAS4 on to lead 28 and at contacts rr3 extends battery via wiper and bank CAS6 on to lead 30 whereupon magnet RCM energises and advances all keys which have been depressed between the hours 08.30 and 08.35 to the position shown at the left in Fig. 4. The key shown in Fig. 2 is assumed to be the first key in the first keying unit, and will be number 000; if this is one of such depressed keys, earth will be extended back from this key over contact spring 19 and strapping connection between terminals 22 and 21, bank and wiper IAS2, lead 26, bank and wiper CAS2, contacts rr1, ab2 and um1 to battery via relay PR. Relay PR in operating, at contacts pr1 will disconnect the circuit for magnet UM before it has time to have been energised by the earth normally connected to lead 28 in the keying unit and at contacts pr2 energises the printing magnet PM. The time 08.35 and the key number 000 of the late employee concerned are now printed on a tape 31 or its equivalent.

The printing magnet PM in energising closes contacts pm which complete an operating circuit for the units magnet UM from the earthed lead 28 and this magnet in operating, at contacts um1 opens the circuit of relay PR and at contacts um2 prepares a circuit for applying battery to lead 29. Relay PR in releasing at contacts pr1 maintains a circuit for magnet UM independently of contacts pm and at contacts pr2 extends battery over lead 29 to energise the magnet IAM of the individual access switch IAS, the circuit extending over operated interrupter contacts rcm of magnet RCM which will be still operated at this time. Contacts pr2 also release the printing magnet PM, whereupon the tape 31 or its equivalent is advanced one step in readiness for the printing of details of the next late employee.

Magnet IAM in energising, at contacts iam opens the circuit of units magnet UM, whereupon the reverse drive units wheel is now advanced from 0 to 1. Magnet UM in releasing, at contacts um2 disconnects the battery connection over lead 29 to the magnet IAM, whereupon the IAS switch wipers are advanced to the next position where they will connect with the second key No. 001 of the keying unit. Magnet UM also at contacts um1 re-connects relay PR via wiper and bank CAS2 to lead 26 which will now be extended via wiper IAS2 to contact 19 of the second key on the unit.

If the employee concerned is correspondingly late, relay PR will be again operated and the cycle of operations described is repeated with the exception that in this instance the key number 001 is printed on the tape as well as the time 08.35.

If the employee concerned has not yet depressed his key, relay PR will not operate and the stepping cycle will continue by the interaction of magnets UM and IAM without any record being made by magnet PM.

The units wheel and the individual access switch IAS advance in step with one another and when ten keys on the first keying unit have been dealt with the units wheel will advance from 9 to 0 and in so doing cause the tens wheel to advance from 0 to 1. When all fifty keys on the first unit have been tested, the units wheel will advance from 9–0 and will carry with it the tens wheel from 4–5, while the IAS switch wipers will be stepped on once again into the home position 1 by the IAM magnet and the means heretofore referred to.

The units wheel is adapted to open contacts UN in position 0, while the tens wheel is adapted to open contacts TN in positions 0 and 5 respectively. Hence when the units wheel initially moved off 0 an operating circuit was completed for relay SB in series with the upper winding of relay RR. Relay SB in operating at contacts sb2 prepares a circuit for the hundreds wheel magnet HM, at contacts sb3 completes a local locking circuit for itself over its lower winding and disconnects the initial circuit for relay RR, and at contacts sb4 prepares an energising circuit for the switch magnet CAM.

When the units and tens wheels are advanced to 0 and 5 respectively, as will be the case after the first fifty keys have been dealt with, off-normal contacts UN and TN will open, whereupon relay RR is released. At contacts rr1 and rr2 any further circuit for relay PR and magnet UM is opened, while at contacts rr3 the battery connection is removed from lead 30, whereupon magnet RCM of the first keying unit releases and so advances all keys occupying the position shown in Fig. 4 to that shown in Fig. 5. At contacts rr4 the hundreds wheel magnet HM is energised, while at contacts rr5 the switch magnet CAM is energised. Contacts cam and hm in opening disconnect the circuit of relay SB, whereupon at contacts sb2 and sb4 magnets HM and CAM are de-energised. The former in de-energising advances the hundreds type wheel one step, but as indicated in the table of Fig. 6, the marking remains at 0, while the CAM magnet in de-energising advances the switch wipers to position 2 in order to give access to the second keying unit comprising keys 050–099. Contacts cam in closing re-operate relay RR over its lower winding and the cycle of operations as previously described is repeated.

When the fifty keys 050–099 have been dealt with, the units wheel will again be stepped on to 0 and will carry with it the tens wheel to 0, whereupon off-normal contacts UN and TN will once again open and relay SB after having been operated during the cycle will again commence to release. On the release of relay SB the hundreds wheel will be advanced to the next position where the marking is 1 and the CAS switch will be advanced a further step to give access to the next fifty keys 100–149.

In this manner each of the twenty blocks of fifty keys is dealt with in turn and when ultimately all twenty blocks have been dealt with, the CAS switch in advancing to position 21 will open the holding circuit of relay RC. Thereupon at contacts rc2 and rc3 self-interrupted driving circuits are completed for the magnets HM and CAM and when both the hundreds type wheel and the access switch have reached their home positions the driving circuit will be opened at the off-normal springs HN and at wiper and bank CAS7 respectively. In normal operation of course, the hundreds type wheel will already have been advanced to the zero position over the regular circuit. The control unit will now await the next time pulse.

In response to the next time pulse, contacts $cm1$ and $cm2$ are again closed, whereupon the minutes wheel is advanced to 40, the "record" cam contacts $c3$ still remaining closed in this position of the minutes wheel. Relay RC is operated and locked as before and the operations previously described are repeated. These operations again take place at the end of each subsequent five-minute period.

Assuming now that the starting time for some of the employees is 09.00 hours, when the minutes wheel is advanced to 00 at 09.00 hours the "late A" contacts $c1$ will be operated in addition to the "record" contacts $c3$. Hence, at 09.05 hours when the timing contacts $cm1$ and $cm2$ re-close, relay RD will be operated in addition to relay RC, and the resulting operations are as previously described with the exception that in addition the "late start" employees keys can now be connected with by relay PR over wiper and bank CAS1 to which connection is had via operated contacts $rd2$. For such employees the contact spring 16 on their push key is connected up to bank IAS1 by a strapping connection between terminals 22 and 20 instead of to bank IAS2 by a strapping connection between terminals 22 and 21. No record is made of such employees if they arrive before their own specified time of arrival, namely 09.00 hours, their keys being fully operated without being recorded at the end of the five-minute period concerned. When however at 09.05 hours connection is made with such an employee's key which has been depressed between 09.00 and 09.05, relay PR will be operated and will function to record this key against the time concerned. The recording of late ordinary employees will, of course, not be interfered with by the above described arrangements.

Similarly, at 09.10 hours and at subsequent five-minute intervals both the ordinary and "late-start" employees will be recorded against the times they depress their keys. Other special starting times could be catered for by providing additional cam contacts and associated relays.

By a certain time of day, say 10.00 hours, all employees who have not yet depressed their keys will be considered as absent, and the access switch in each keying unit is then caused to test for all keys still normal, i. e. employees absent, each one of which will be recorded on the tape in the following manner.

When the minutes wheel is advanced to 55 at 09.55 hours, the "late A" cam contacts $c1$ may be opened and the "absent" cam contacts $c2$ are closed in addition to the "record" contact $c3$. At 10.00 hours when contacts $cm1$ and $cm2$ re-close, relay AB will be operated and thereupon locks over bank and wiper CAS2. At contacts $ab2$ relay PR is connected up to the "absent" wiper and bank CAS3, and if the wiper is in position 1 connection will be made over lead 27 with wiper IAS3 in the keying unit shown. Contacts of bank IAS3 connect up via a strapping connection between terminals 23 and 24 with the contact spring 18 which is earthed so long as the push key is normal. Hence when the "record" relay RC in operating initiates the cycle of operations as previously described, whenever the individual access switch wiper IAS3 encounters earth, relay PR will be operated to record on the tape the time and the number of the absent employee's key concerned. In this instance it will be noted that contacts $ab3$ prevent the extension of battery via contacts $rr3$ on to wiper CAS6 and thence to the RCM magnets so that in this case no attempt is made to fully operate the normal keys of absent employees. In the unlikely event of an employee depressing his key between 09.55 hours and 10.00 hours, he will be recorded neither late nor absent and would thus be treated as punctual. This trouble could be readily overcome for instance by extending a signal to the keying units whenever "absent" recording is to take place which would prevent any further keys from being manually depressed.

Finally, at 10.05 hours all keys are released and the equipment made ready for further use at the next entry time, and this is done in the following manner. When the units wheel is advanced to 00 at 10.00 hours the "absent" contacts $c2$ and "record" contacts $c3$ are opened, the relays AB and RC concerned remaining operated until the end of the "absent" recording cycle, and in addition the "release" contacts $c4$ are closed.

At 10.05 hours when contacts $cm1$ and $cm2$ are operated, relay Z is brought up and locks over its right-hand winding. At contacts $z2$ an operating circuit is completed for relay CT and at contacts $z3$ a circuit is prepared to extend battery on to wiper CAS5. Relay CT in operating locks over its contacts $ct1$, at contacts $ct3$ disconnects any circuit for the hundreds wheel magnet HM and at contacts $ct4$ brings up relay SB. Relay SB in operating at contacts $sb1$ extends battery on to wiper CAS5 and with this wiper in position 1 battery will extend over lead 29 to bring up the release magnet RLM in the first keying unit in response to which the fully depressed keys of this unit are released. At contacts $sb4$ the switch magnet CAM is energized; whereupon contacts $cam$ release relay SB. Thereupon at contacts $sb1$ the release magnet RLM in the first keying unit is de-energised; while at contacts $sb4$ magnet CAM is de-energised to advance the access switch wipers to position 2 from which access is had to the second keying unit. The cycle of operations continues until all keying units have been dealt with, whereupon relays RC, Z and CT are released. The access switch CAS is now homed and all equipment is in readiness for the next time recording period, say beginning at 13.30 hours.

In case it is also desired to record exit times between say 10.05 hours and a specified exit time of say 12.30 hours, the "record" contacts $c3$ will be operated during this time and all keys depressed will be recorded. At 12.30 hours the "release" contacts $c4$ become effective to release all keys which have been fully operated during the morning.

At the next predetermined entry time, say 13.30 hours, the "reset" contacts $c5$ will again become effective as at 08.30 hours, and afterwards the operations will follow as already described up to say 15.00 hours after which employees who have not depressed their keys by this time will be regarded as absent.

Other special time recording requirements involving split entry and leaving times can readily be met by suitably developed circuits based on the principles hereinbefore disclosed and described.

Since the well-tried automatic telephony technique is used in carrying out the object of the present invention, it is moreover obvious that a system of supervision as used in automatic telephony could be incorparted to cover possible faults.

It is not essential that there should be a separate set of conductors from the common unit to each individual keying unit as it possible to utilise a ring main set of conductors and by means of sequence switching at the common and individual units, effected say by means of pilot wire control, each keying unit could be connected up in turn to the ring main conductors and at the common unit these conductors would be connected up in turn to succeeding parts of the banks of the common access switch CAS.

The arrangements described whereby employees who conform to their specified entry and/or leaving times are not recorded considerably reduces the clerical work involved, since such employees usually provide by far the greatest proportion of the total number concerned.

It will be noted also that the circuits have been arranged so that no source of electric power is required at the keying units, the energy for operating the various magnets being supplied from the central point.

What we claim as new and desire to secure by Letters Patent is:

1. In a workman's time recording system, a plurality of devices each operable by a workman, each of said devices having a plurality of operated positions, the movement of each of said devices from a first to a second position being effected manually by a workman, said devices being divided into two groups, apparatus for moving said devices from said second to a third position, timing means for operating said apparatus at a predetermined start time for moving any of said devices, which are in the second position, to said third position, said means periodically operating said apparatus thereafter for moving subsequently operated ones of said devices in either of said groups from the second to the third position and recording means operated thereby to make a record of only those devices so moved as are included in one of said groups, and means operated a predetermined time interval after said start time for thereafter causing subsequently operated ones of said devices in either of said groups moved from the second to the third position to be recorded.

2. In a time recording system, a plurality of selectively operable devices, each of said devices having a plurality of operated positions, the movement of each of said devices from a first to a second position being effected manually at various times, common control apparatus for moving said devices from said second position to a third position, and timing means operated at predetermined time intervals for operating said apparatus to move any of said devices which are in the second position to a third position, and means for recording only the devices manually moved at certain times of said various times.

3. In a workman's time recording system, a plurality of stations each including a plurality of keys, each of said keys at times operated by a workman to register desired information, a central station having recording equipment, lines extending from said central station to each of said first stations, switching means at said central station, means for periodically operating said switching means to associate the recording equipment thereat with each of said lines in succession, and switching means at each of said first stations operated, only when connection is made with the individual line leading thereto to successively associate each of the keys thereat with the recording equipment at said central station over the line extending thereto and during the time that the recording equipment is associated therewith, said recording equipment operated to register information at predetermined times in accordance with the positions of said keys at said times.

4. In a combination with a recording system, a group of keys each having a plurality of operating positions, latching means operative to retain any key in an advanced position when it is operated thereto, said keys manually moved from a first to a second position, common means operative to advance any of said keys which are in the second position to a third position, further common electrically actuated means operative to release said latching means so as to permit all operated keys to restore to the first position, and means for electrically controlling said common means to move and restore said keys.

5. In a workman's time recording system, a plurality of devices each arranged to register an entry, means for clearing all operated devices at a predetermined start time, recording means, means thereafter periodically operating said first means and said recording means to record and clear subsequently operated devices, said last means for electrically operating said first means and said recording means to record all unoperated devices at a predetermined absent time.

6. A workman's time recording system as claimed in claim 5 in which said plurality of devices comprises a group of keys each having a plurality of operating positions and each being operable from a first position to a second position to register an entry, said first means for clearing the operated devices including a common means operative to advance all keys which are in the second position to a third position.

7. In a workman's time recording system, a plurality of numbered devices, said plurality of devices being divided into two groups, means for clearing all operated devices at a predetermined start time, and for thereafter periodically clearing subsequently operated devices in either of said groups and recording means operated thereby to make a record of only such subsequently operated devices as are included in a particular one of said groups, and means operated a predetermined time interval after said start time for causing said last means to thereafter periodically clear and record subsquently operated registers in either of said groups.

8. In a workman's time recording system, a plurality of devices each having a normal and a plurality of operated positions, each device movable by a workman to its first operated position to indicate his presence, common control equipment including recording means, means for operating said equipment at a predetermined time to move all operated devices from the first to the second operated positions, and for operating said equipment and said recording means at a later time to record all unoperated devices, and means for causing said equipment and said recording means to record all operations of a device to a first position between said times.

9. In a time recording device, an element movable from a normal to an operated position and to a nonrecording position, a common control equipment, means for operating said equipment to move all of the devices, moved to operated position before a predetermined time, to their nonrecording positions, means for operating said equipment to periodically test all said devices and recording means operated thereby to record the devices moved to operated positions after said predetermined time, and for later testing all of the devices to record all unoperated devices.

10. In a workman's time recording system, a plurality of keys one for each workman, each key having a normal position, an operated position and a nonrecording position, circuits completed by each key in its first two positions, recording means, a timed control device having means for moving all operated keys from their operated to nonrecording positions at a start time, for testing the circuits completed by the keys in their operated positions at periodic intervals thereafter to operate said recording means to record late operated keys, and for thereafter testing all the circuits controlled by the keys in their normal positions to operate said recording means to record all unoperated keys.

11. In a workman's time recording system a plurality of numbered devices arranged in groups, a series of cams, a recording means controlled by said cams for recording the operation of said devices of said groups, each said device having a plurality of positions and manually movable from the first position to the second position by a workman, means controlled by said cams for moving said devices from the second position to the third and fourth positions and for operating said recording means to record the time of said manual movement and number of each said device.

12. In a time recording system, a plurality of numbered devices movable to a plurality of operative positions, one of which is a nonrecording position, and divided into two or more classes, a timing control means, a recording means, means controlled by said timing control means for operating said means to record the time of movement and number of each said device of the said first class only that is in the first operated position, for moving both said classes of said devices from the first operated positions to their nonrecording positions, to thereafter periodically record any said devices of all classes which are in the said first operated position and move any such device from the first operated position to the nonrecording positions.

REGINALD TAYLOR
GEORGE THOMAS BAKER.

REFERENCES CITED

The following references are of record in the file of this patent:

UNITED STATES PATENTS

| Number | Name | Date |
| --- | --- | --- |
| 1,169,067 | Crumpton | Jan. 18, 1916 |
| 1,194,378 | Goodrum | Aug. 15, 1916 |
| 1,474,414 | Elliott | Nov. 20, 1923 |
| 1,632,106 | Zogbaum | June 14, 1927 |
| 1,676,742 | Ostline | July 10, 1928 |
| 1,855,427 | Swarz | Apr. 26, 1932 |
| 2,140,336 | Shoup | Dec. 13, 1938 |
| 2,364,097 | Rathbun | Dec. 5, 1944 |
| 2,383,826 | Spencer | Aug. 28, 1945 |